(12) United States Patent
Moad et al.

(10) Patent No.: US 6,291,620 B1
(45) Date of Patent: Sep. 18, 2001

(54) POLYMER SYNTHESIS

(75) Inventors: Graeme Moad; Catherine Louise Moad, both of Kallista; Julia Krstina, Chelsea; Ezio Rizzardo, Wheelers Hill, all of (AU); Thomas Robert Darling; Charles Thomas Berge, both of Wilmington, DE (US)

(73) Assignees: E. I. du Pont de Nemours and Company, Wilmington, DE (US); Commonwealth Scientific Industrial Research Organization, Victoria (AU)

( * ) Notice: Subject to any disclaimer, the term of this patent is extended or adjusted under 35 U.S.C. 154(b) by 0 days.

(21) Appl. No.: 08/952,536

(22) PCT Filed: Nov. 8, 1995

(86) PCT No.: PCT/US95/14428

§ 371 Date: Nov. 20, 1997

§ 102(e) Date: Nov. 20, 1997

(87) PCT Pub. No.: WO96/15157

PCT Pub. Date: May 23, 1996

(30) Foreign Application Priority Data

Nov. 9, 1994 (AU) .............................................. PM9304/94

(51) Int. Cl.$^7$ ....................................................... C08F 2/38
(52) U.S. Cl. ......................... 526/319; 526/288; 526/455; 526/329; 526/78; 526/79; 526/82; 526/83; 526/84; 526/209; 526/213; 526/214; 526/215
(58) Field of Search ................................. 526/319, 455, 526/288

(56) References Cited

U.S. PATENT DOCUMENTS 4,722,984 * 2/1988 Janowicz ............................ 526/123
5,126,411 * 6/1992 Rauterkus et al. .................... 525/455
5,294,678 * 3/1994 Tse et al. ............................. 525/319
5,368,976 * 11/1994 Tajima et al. ........................ 430/176
5,371,147 * 12/1994 Spinelli et al. ...................... 525/288

FOREIGN PATENT DOCUMENTS

0261942 * 3/1988 (EP) .
0 597 747 * 6/1992 (EP) .
WO 92/09639 * 6/1992 (WO) .
WO 93/22355 * 11/1993 (WO) .

* cited by examiner

*Primary Examiner*—David W. Wu
*Assistant Examiner*—Tanya Zalukawa
(74) *Attorney, Agent, or Firm*—James A. Costello; Sudhir G. Deshmukh

(57) ABSTRACT

Process for the synthesis of block polymers, homopolymers and copolymers of narrow polydispersity having formula (1) by contacting selected vinyl monomer(s), vinyl-terminated compound(s) and free radicals in which effective control of production of polymer is achieved by controlling the mole ratio of vinyl monomer(s), vinyl-terminated compound(s) and free radicals relative to one another; and polymers produced thereby (I)

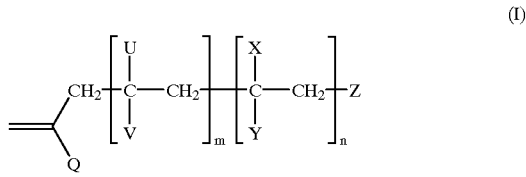

9 Claims, No Drawings

POLYMER SYNTHESIS

1. FIELD OF THE INVENTION

This invention relates to a process for the synthesis of block copolymers and polymers of narrow polydispersity based on radical polymerization of monomers in the presence of unsaturated chain transfer agents.

2. BACKGROUND

Block copolymers are useful as pigment dispersants, surfactants, compatibilizers for polymer blends, thermoplastic elastomers and in a variety of other applications. Polymers with narrow molecular weight dispersity can enhance melt viscosity behavior, solids-viscosity relationships of polymer solutions and sharper melt transitions than the same composition at a higher polydispersity.

Conventional commercial techniques for synthesizing narrow polydispersed polymers and block copolymers include free-radical polymerization. Radical polymerization may be accomplished: (1) through the use of pseudo or quasi-living polymerization. These techniques make use of low molecular weight transfer agents and/or chain terminators; (2) through the use of transformation chemistry; (3) through the use of multifunctional or polymeric initiators.

This invention provides a method of employing certain vinyl compounds in the synthesis of polymers with narrow molecular weight distribution and block copolymers by free radical polymerization Block copolymerization by radical polymerization has been described in PCT Application No WO 93/2355. This PCT application describes the mechanism of block copolymer formation but does not define conditions necessary for the preparation of high purity block copolymers, nor formation of narrow polydispersity resins.

SUMMARY OF THE INVENTION

This invention is directed to a process for the synthesis of polymers (block, homo- and copolymers) of the general formula:

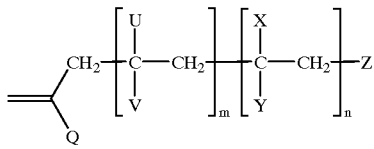

1 comprising contacting:

(i) a vinyl monomer of the formula $CH_2=CUV$ (ii) a vinyl-terminated compound of formula

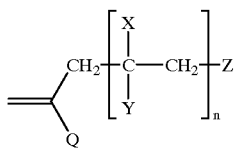

2 and (iii) free radicals, produced from a free radical source; and increasing the molar amount of polymers, 1, by one or both of:

(a) decreasing the molar amount of (iii) for any given conversion of (i); and
(b) decreasing the molar amount of (i) for any given conversion of (iii);

wherein:

Q is selected from the group H, R, OR, $O_2CR$, halogen $CO_2H$, $CO_2R$, CN, $CONH_2$, CONHR and $CONR_2$;

U is selected from H and R;

V is selected from R, OR, $O_2CR$, halogen, $CO_2H$, $CO_2R$, CN, $CONH_2$, CONHR and $CONR_2$;

X is selected from H and R;

Y is selected from R, OR, $O_2CR$, halogen, $CO_2R$, $CO_2R$, CN, $CONH_2$, CONHR and $CONR_2$;

Z is selected from the group H, $SR^1$, S(O)R, $S(O)_2R$, $R^2$ and $R^3$;

R is selected from the group substituted and unsubstituted alkyl, aryl, aralkyl, alkaryl and organosilyl groups wherein the substituent(s) are independently selected from the group carboxyl, epoxy, hydroxyl, alkoxy, amino and halogen;

$R^1$ is selected from the group H, substituted and unsubstituted alkyl, aryl, aralkyl, alkaryl, organosilyl wherein the substituent(s) are independently selected from the group carboxyl, epoxy, hydroxyl, alkoxy, amino and halogen;

$R^2$ is selected from the group free radical initiator-derived fragments of substituted and unsubstituted alkyl, cycloalkyl, aryl, aralkyl alkaryl, organosilyl, alkoxyalkyl, alkoxyaryl, sulfate groups wherein the substituent(s) are independently selected from R, $OR^1$, $O_2CR$, halogen, $CO_2H$ (and salts), $CO_2R$, CN, $CONH_2$,

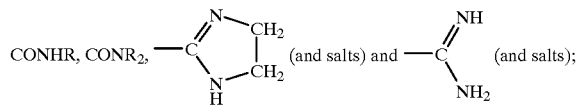

$R^3$ is selected from the group radical chain transfer agent-derived fragments of substituted and unsubstituted alkyl, cycloalkyl, aryl, aralkyl, alkaryl, organosilyl, alkoxyalkyl, alkoxyaryl, and $PR_2$ groups wherein the substituent(s) are independently selected from R $OR^1$, SR, $NR_2$, NHR, $O_2CR$, halogen, $CO_2H$, $CO_2R$, CN, $CONH_2$, CONHR, and $CONR_2$;

m and n are independently $\geq 1$; and when either or both of m and n are greater than 1, the repeat units are the same or different.

Each alkyl in the defined substituents is independently selected from branched, unbranched, and cyclical hydrocarbons having 1 to 20, preferably 1–12, and most preferably 1–8 carbon atoms; halo or halogen refers to bromo, iodo, chloro and fluoro, preferably chloro and fluoro, and organosilyl includes $-SiR^4(R^5)(R^6)$ and the like, wherein $R^4$, $R^5$, and $R^6$ are independently alkyl, phenyl, alkyl ether, or phenyl ether, preferably at least two of $R^4$, $R^5$, and $R^6$ being a hydrolyzable group, more preferably two of which are alkyl ether, wherein alkyl is preferably methyl or ethyl. A plurality of silyl groups can be condensed; for example, an organopolysiloxane such as $-Si(R^4)_2-O-Si(R^5)_2R^6$, wherein $R^4$, $R^5$, and $R^6$ are independently alkyl.

Preferred monomers are methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylate, acrylates and styrene selected from glycidyl methacrylate, 2-hydroxyethyl methacrylate, hydroxypropyl methacrylate (all isomers), hydroxybutyl methacrylate (all isomers), diethylaminoethyl methacrylate, triethyleneglycol methylacrylate, itaconic anhydride, itaconic acid, glycidyl acrylate, 2-hydroxyethyl acrylate, hydroxypropyl acrylate (all isomers), hydroxybutyl acrylate (all isomers), diethylaminoethyl acrylate, triethyleneglycol acrylate, methacrylamide, N-tert-butyl methacrylamide, N-n-butyl methacrylamide, N-methyl-ol methacrylamide, N-ethyl-ol methacrylamide, N-tert-butyl acrylamide, N-n-butyl acrylamide, N-methyl-ol acrylamide, N-ethyl-ol acrylamide, vinyl benzoic acid (all isomers), diethylamino styrene (all isomers), alphamethylvinyl benzoic acid (all isomers), diethylamino alphamethylstyrene (all isomers), para-methylstyrene, p-vinyl benzene sulfonic acid, trimethoxysilylpropyl methacrylate, triethoxysilylpropyl methacrylate, triethoxysilylpropyl methacrylate, dimethoxymethylsilylpropyl methacrylate, diethoxymethylsilylpropylmethacrylate, dimethoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate tributoxysilylpropyl acrylate, triethoxysilylpropyl acrylate, tributoxysilylpropyl acrylate, dimethoxymethylsilylpropyl acrylate, dimethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate, vinyl chloride, vinyl fluoride, vinyl bromide.

In a preferred process, (ii) is selected where Q, —XYC—CH$_2$— and Z are independently selected from one or more of the following:

Q=H, methyl ethyl, butyl, (all isomers), cyclohexyl, methoxy, ethoxy, propoxy, butoxy (all isomers), phenoxy, acetate, propionate, butyrate (all isomers), benzoate, carboxylate, chlorine, bromine, fluorine, iodine, nitrile, amide, N-methylamide, N-ethylamide, N-propylamide, N,N-dimethylamide, N,N-diethylamide, N,N-dibutylamide, N-methyl-N-ethylamide, carboxylate ester of methyl, ethyl, propyl, butyl (all isomers), benzyl, phenyl, 2-hydroxyethyl 3-hydroxypropyl, 2-hydroxypropyl, 4-hydroxy-butyl (all isomers), 3-hydroxybutyl (all isomers), 2-hydroxybutyl, 3-trimethoxysilylpropyl, 3-triethoxysilylpropyl, 3-tributoxy-silylpropyl, 3-tri(isopropoxy)silylpropyl, 2-aminoethyl, 3-aminopropyl, 2-aminopropyl, 4-aminobutyl (all isomers), 3-aminobutyl (all isomers), 2-aminobutyl (all isomers), 2-epoxypropyl, or 3-epoxypropyl;

—XYC—CH$_2$—=derived from one or more of the following monomers: methyl methacrylate, ethyl methacrylate propyl methacrylate (all isomers), butyl methacrylate (all isomers), 2-ethylhexyl methacrylate, isobornyl methacrylate, methacrylate acid, benzyl methacrylate, phenyl methacrylate, methacrylate, methacrylonitrile, styrene, alpha methyl styrene, glycidyl methacrylate, 2-hydroxyethyl methacrylate, hydroxypropyl methacrylate (all isomers), hydroxybutyl methacrylate (all isomers), diethylaminoethyl methacrylate, triethyleneglycol methacrylate, N-tert-butyl methacrylamide, N-n-butyl methacrylamide, N-methyl-ol methacrylamide, N-ethyl-ol methacrylamide, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl, acrylate, 2-hydroxyethyl acrylate, hydroxypropyl acrylate (all isomers), hydroxybutyl acrylate (all isomers), diethylaminoethyl acrylate, triethyleneglycol acrylate, N-tert-butyl acrylamide, N-n-butyl acrylamide, N-methyl-ol acrylamide, N-ethyl-ol acrylamide, vinyl benzoic acid (all isomers), diethylamino styrene (all isomers), p-vinyl benzene sulfonic acid, para-methylstyrene, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxy-methylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate vinyl acetate, or vinyl butyrate;

Z=H, SR$^1$, S(O)R, S(O)$_2$R,R$^2$, or R$^3$;

R=methyl, ethyl, propyl, n-butyl, tert-butyl, isobutyl, phenyl, benzyl, 2-phenylpropyl, trimethoxysilylpropyl, tributoxysilyl-propyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxy-propyl, or heptafluoropropyl;

R$^1$=hydrogen, methyl, ethyl, propyl, n-butyl, tert-butyl, isobutyl, phenyl, benzyl, 2-phenylpropyl, trimethoxysilyl-propyl, tributoxysilylpropyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxypropyl, or heptafluoropropyl;

R$^2$=2,4-dimethylpentanenitrile, 2-methylbutanenitrile, 2-methylpropanenitrile, cyclohexanecarbonitrile, 4-cynanopentanoic acid, N,N'-dimethyleneisobutylramidine, N,N'-dimethyleneisobutylramidine hydrochloride, 2-amidinopropane, 2-amidinopropane, 2-amidinopropane hydrochloride, 2-methyl-N-[1,1-bis(hydroxymethyl)ethyl]propionamide, 2-methyl-N-[1,1-bis(hydroxymethyl)-2-hydroxyethyl]propionamide, 2-methyl-N-(2-hydroxyethyl)propionamide, isobutylamide hydrate, hydroxyl, or sulfate;

R$^3$=1,1-bis(carboethoxy)ethyl, 1,1-bis(carbomethoxy) ethyl, carboethoxy)methyl, bis(carbomethoxy)methyl, 1-carboethoxy-1-phenyl ethyl, 1-carbomethoxy-1-phenyl ethyl, chlorine, bromine, fluorine, iodine, 1-methyl-1-[carbo(2-epoxypropoxy)]ethyl, 1-methyl-1-[carbo(2-hydroxyethoxy)]ethyl, 1-methyl-1-[carbo(4-hydroxy-butoxy)]ethyl, 1-methyl-1-[carbo(2-aminoethoxy)]ethyl, 1-methyl-1-[carbo(3-trimethoxysilylpropoxy)]ethyl, 1-methyl-1-[carbo(3-triethoxysilylpropoxy)]ethyl, 1-methyl-1-[carbo(3- dimethoxyethoxysilylpropoxy)]ethyl, 1-methyl-1-[carbo(2-methoxyethoxy)]ethyl, (N,N-dimethylamino)(cyano)methyl, N,N-dimethylamino (benzo)methyl, thiomethyl(cyano)methyl, or thioethyl (cyano)methyl.

In a preferred process, (iii) is derived from one or more of the following initiators: 2,2-azobis(isobutyronitrile), 2,2'-azobis(2-butanenitrile), 4,4'-azobis(4-cyanpentanoic acid), 1,1'-azobis(cyclohexane-carbonitrile), 2-(t-butylazo)-2-cyanopropane, 2,2'-azobis[2-methyl-N-(1,1-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine)dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)ethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide)dihydrate, t-butyl-peroxyacetate, t-butylperoxybenzoate, t-butylperoxybenzoate, t-butylperoxyoctoate, t-butylperoxyneodecanoate, t-butylperoxyisobutyrate, t-amylperoxypivalate, t-butylperoxypivalate, cumene hydropeoxide, dicumyl peroxide, benzoyl peroxide, potassium persulfate, ammonium persulfate.

DETAILS OF THE INVENTION

Compound (2) can be prepared by several methods. Two non-restrictive examples of convenient methods of preparing compounds of structure (2) are by free radical polymerization in the presence of cobalt transfer agents or organic transfer agents that are capable of chain transfer by addition fragmentation. Cobalt chain transfer agents represent a broad class of complexes some of which are described in U.S. Pat. Nos. 4,694,054, 4,680,352, 4,722,984, and WO 87/03605.

Organic chain transfer agents include allylic sulfides, allylic bromides, vinyl terminated methacrylic oligomers (dims, trimers, etc or distributions), a-methylstyrene dimer and related compounds. Other methods of preparation are also possible.

Said compounds of structure (2) can also be a block copolymer of general structure (1) and the process can then be used to form tri- or multiblock copolymers.

Substituent Q of (1) and (2) is chosen to convey appropriate reactivity to the double bond in radical polymerization of the desired monomer or monomers under polymerization conditions. It should preferably be aryl, $CO_2H$, $CO_2R$, $CN$, or $CONR_2$ in the case of activated monomers (e.g. styrene, acrylics) or H, R, OR, $O_2CR$, or halogen in the case of non activated monomers (e.g. vinyl acetate, vinyl chloride).

The substituents Q and Z can also be chosen so as to introduce any required end-group functionality into the polymer (1). These end groups can be the same or different and are chosen such that the final polymer is a telechelic polymer. Suitable end groups are those compatible with free radical polymerization and include epoxy, hydroxy, carboxylic acid, carboxylic ester.

Monomer $CH_2=CUV$, as used herein include acrylic, methacrylic and styrene monomers, mixtures thereof, and mixtures of these monomers with other monomers. As one skilled in the art would recognize, the choice of comonomers is determined by the steric and electronic properties of the monomer. The factors which determine copolymerizability of various monomers is well documented in the art.

When U and/or X=hydrogen, the use of reaction temperatures above 100° C. has been found to favor block copolymer formation.

The process is compatible with forming (2) and the polymer (1) sequentially in a "one-pot" procedure. In this case, it is important to destroy residual transfer agent remaining from the synthesis of (2). For compounds (2) prepared in the presence of cobalt catalytic chain transfer agents, the use of potassium persulfate, a peroxide or similar reagent deactivates any cobalt chain transfer agent remaining from the compound (2) preparation.

The length of the $—(CXY—CH_2)_n—$ is determined by the molecular weight of (2). Unreacted (2) will constitute a contaminant The conversion level of (2) will define the purity of (1). The higher the conversion of (2) the higher the purity of (1).

To obtain narrow dispersity in the final polymer, reaction conditions are selected such that polymerization in the absence of (2) gives molecular weights substantially higher (at least 5-fold) than in the presence of (2). In the same manner, to obtain high block purity in the block copolymer synthesis, reaction conditions are selected such that polymerization in the absence of compound (2) gives molecular weights substantially higher (at leas 5-fold) than in the presence of compound (2).

With this as a guide, the control of the molar amount of free radicals (iii) at any given conversion of (i) will determine how much polymer containing (i) and not (2) is formed. One can minimize the number of free radicals, via initiators, in the reaction media during the polymerization so that bimolecular termination reactions, or radical-radical reactions, are minimized. These reactions produce polymers that are undesirable when one is interested in narrow dispersity polymers or substantially pure block copolymers. Increasing the moles of (ii) in the presence of (iii) will enhance the transfer reaction which is necessary to produce block, telechelic polymers and homopolymers of narrow molecular weight dispersity. In like fashion, reducing the molar amount of monomer (i) in the reactor at any given time at any given conversion of (iii), will provide additional control thus assuring uptake of (ii) as a transfer agent. Slow, incremental uptake of (i) under conditions which optimize chain transfer contribute to narrow polydispersity. The present invention allows preparation of homo- and copolymer wit substantially narrower polydispersity than can be prepared by conventional free radical polymerization. Polymers with polydispersity <1.5 are not available using conventional free radical polymerization technology. The discovered interrelationship of(a)(b) allows preparation of polymer with polydispersities below 1.7 and even less than 1.5.

The process can be successfully conducted by bulk, solution, suspension or emulsion polymerization. However, bearing in mind the above-mentioned condition, a preferred process for forming high molecular weigh& block copolymers is by emulsion or dispersion polymerization techniques. Emulsion polymerization typically offers very high molecular weights for polymerization carried out in the absence of compound (2). As a consequence, it is possible to prepare high molecular weight, high purity block copolymers with narrow polydisperity. Other advantages of emulsion polymerization over solution or bulk polymerization are faster polymerization times, high conversions, avoidance of organic solvents, and low chain transfer to water.

The present process offers significant advantages over other processes for preparing block or narrow polydispersity polymers based on conventional living polymerization techniques (e.g. cationic, anonic, coordination or group transfer polymerization). Advantages include compatibility with monomers with active hydrogens (for example, methacrylic acid, 2-hydroxyethyl methacrylate, etc.), or reactive functionality (for example, glycidyl methacrylate), the use of protic media (for example, isopropanol, water), and use of inexpensive commercial grade monomers.

The success of block copolymerization via the emulsion process depends on the compatibility of the monomer(s) and compound (2). The polymerization of hydrophobic monomers (e.g. butyl methacrylate) and moderately hydrophobic compounds (2) (e.g. methacrylate), or moderately hydrophobic monomers with hydrophilic compounds (2) (e.g. methacrylic acid) can be successfully carried out.

Emulsion polymerization of hydrophobic monomers (for example, styrene, butyl methacrylate, etc.) in the presence of water-soluble compounds (2) may lead to product contaminated with homopolymer of the hydrophobic monomers. In these circumstances, addition of appropriate cosolvents (for example, 2-butoxyethanol) to the emulsion polymerization medium gives improved yields of block copolymer.

Changing the hydrophobic-hydrophilic balance in the compound (2) also gives improved yield of block copolymer. For example, block copolymers based on hydrophobic monomers (for example, styrene, butyl methacrylate, etc.) and 60:40 methyl methacrylate-co-methacrylic acid compounds (2) are readily synthesized in high yield and purity by emulsion polymerization.

The low cost of the process means that purification of the block copolymer can be economically viable when this is necessary or desirable. Thus, lower yields of block copolymers can be tolerated than with other synthetic methods.

The process of the invention is further illustrated by the following Examples in which these abbreviations are used:

| | |
|---|---|
| EHMA | 2-ethylhexyl methacylate |
| n-BA | n-butyl acrylate |
| BAc | butyl acetate |
| EAc | ethyl acetate |
| GMA | glycidyl methacrylate |
| n-BMA | n-butyl methacrylate |
| t-BMA | tert-butyl methacylate |
| i-BMA | iso-butyl methacrylate |
| BzMA | benzyl methacrylate |
| EMA | ethyl methacrylate |
| HEMA | hydroxyethyl methacylate |
| iPrOH | 2-propanol |
| MAA | methacrylic acid |
| MEK | methylethyl ketone |
| MMA | methyl methacrylate |
| PhMA | phenyl methacrylate |
| S | styrene |
| pMS | p-methylstyrene |
| CHMA | cyclohexyl methacrylate |
| VAZO 52 | 2,2'-azobis(2,4dimethylpentanenitrile) |
| VAZO 88 | 1,1'-azobis(cyclohexanecarbonitrile) |
| WAKO VA044 | 2,2'-azobis(N,N'-dimethyleneisobutyramidine) dihydrochloride |
| iprCo(III)DMG | [bis[m-[(2,3-butanedione dioximato)(2-)-O:O']] tetrafluorodiborato (2-)-N,N',N",N'"](1-methylethyl)(aqua) cobalt |
| MeCo(III)DEG | [bis[m-[(2,3-hexanedione dioximato)(2-)-O:O'] tetrafluorodiborato(2-)-N,N',N",N'"](methyl)(aqua) cobalt |

EXAMPLES 1-9

Methacrylic Acid Block Copolymers by Emulsion Polymerization

This is the basic recipe for surfactantless emulsion polymerization and illustrates the use of block copolymers as latex stabilizers.

| Preparation of Methacrylic Acid-block-Methyl Methacrylate | |
|---|---|
| Water | 75.0 g |
| NaHCO$_3$ | 0.151 g |
| MAA$_{12}$-block-BMA$_4$ | 0.376 g |
| MAA Compound 2 ($^1$H NMR: $\overline{M}_n$ 950) | 10.07 g |
| MMA | 1.00 g |
| 4,4' azobis(4-cyanopentanoic acid) | 0.140 g |
| MMA | 10.0 g |

The water was degassed in a multi-neck, 250 mL reactor under nitrogen for 20 min. The solution was heated to 85° C. The sodium bicarbonate, block copolymer and MAA Compound 2 were added, and the solution was degassed for a further 10 min. The initiator and a portion of the MMA (1.00 g) were added as single shots and the remaining MMA added as a feed over 90 min. The reaction mixture was held at 85° C. for a further 90 min.

GPC: $\overline{M}_n$ 3010, $\overline{M}_w$ 4270; Dispersity 1.42.

The yield of block copolymer vs. 'homopolymer' formed by emulsion polymerization depends on the reactive hydrophobicity of the compound (2) and monomer. The examples given in the table show that, for systems where this is a problem (e.g. MAA-block-BMA), the yield of block copolymer are improved by use of an appropriate cosolvent.

TABLE 1

Methacrylic Acid Block Copolymers by Emulsion Polymerization[a]

| Example | Monomer | Cosolvent | % block[b] |
|---|---|---|---|
| 1 | MMA | none | 100 |
| 2 | EMA | none | 70 |
| 3 | nBMA | none | 45 |
| 4 | nBA | none | 20 |
| 5 | MMA/BMA 1:2 | none | 50 |
| 6 | MMA/BMA 2:1 | none | 60 |
| 7 | MMA//BMA triblock (1:2) | none | 60 |
| 8 | nBMA | 10% 2-ethoxyethanol[c] | 60 |
| 9 | nBMA | 10% 2-butoxyethanol[c] | 100 |

[a]Methacrylic acid macomonomer ($^1$H NMR: $M_n$ 950).
[b]Estimated by GPC. Remainder is 'B block' homopolymer
[c]Feed time increased to 270 min

EXAMPLES 10–14

Methacrylate Ester Based Block Copolymers

| Preparation of Phenyl Methacrylate-block-Butyl Methacrylate A. Preparation of PhMA compound (2) | | |
|---|---|---|
| | Water | 75 g |
| | SDS (1 wt % aq. solution) | 3 g |
| | 4,4'-azobis(4-cyanopentanoic acid) | 0.140 g |
| Monomer Shot: | PhMA | 3.5 g |
| | MeCo(III)DEG | 15.0 mg |
| Monomer Feed: | PhMA | 31.7 g |
| | MeCo(III)DEG | 11.8 mg |

The water, initiator and SDS were combined and degassed under nitrogen in a multi-necked 250 mL reactor. The mixture was heated to 80° C. and the monomer shot added immediately. The monomer feed was added over 90 min.

The temperature was increased to 85° C. and held for a further 90 min.

GPC: $\overline{M}_n$ 1100 $\overline{M}_w$ 2400; Dispersity 2.18.

| B. Preparation of PhMA-block-BMA | | |
|---|---|---|
| | PhMA compound (2) latex (33% solids)* | 30 g |
| Initiator Feed: | K$_2$S$_2$O$_8$ (0.2 wt % aq. solution) | 56.8 mL |
| Monomer Feed: | nBMA | 60 g |
| | a. 0–90 min 0.25 mL/min | |
| | b. 90–180 min 0.50 mL/min | |

*from Part A

The PhMA compound (2) latex ($\overline{M}_n$ 1100, $\overline{M}_w$ 2400; Dispersity 2.18) was heated to 80° C. in a multi-neck 250 mL reactor under nitrogen for 50 min. The initiator and monomer feeds were added concurrently over 180 min. Portions of SDS (1 g of a 10 wt % aqueous solution) were added hourly during the monomer addition. After monomer addition was complete the reaction temperature was increased to 85° C. and held for a further 90 min.

GPC: $\overline{M}_n$ 14500, $\overline{M}_w$ 33400; Dispersity 2.30

TABLE 2

Methacrylic Ester Block Copolymers prepared by Emulsion Polymerization

| Example | Compound 2 | Monomer | Block Composition[a] | $M_n$[b] | Dispersity |
|---|---|---|---|---|---|
| 10 | PhMA | nBMA | (PhMA)$_7$//(nBMA)$_{94}$ | 14500 | 2.30 |
| 11 | MAA | MMA | (MAA)$_{11}$//(MMA)$_{14}$[c] | 3010 | 1.42 |
| 12 | MAA | nBMA[d] | (MAA)$_{11}$//(nBMA)$_{22}$ | 4030 | 2.31 |
| 13 | MMA | nBMA | (MMA)$_{19}$//(nBMA)$_{46}$ | 6700 | 1.19 |
| 14 | tBMA | nBMA | (tBMA)$_{17}$//(nBMA)$_{24}$ | 5780 | 1.33 |

[a]estimated from GPC
[b]GPC (polystyrene equivalents)
[c]estimated from $^1$H NMR
[d]10% 2-butoxyethanol (see Table 1)

EXAMPLES 15–19
narrow Polydispersity Polymers

These examples illustrate the preparation of a polymer of relatively narrow polydispersity by emulsion polymerization. Polydispersities (>1.5) are narrower than expected by normal polymerization with chain transfer (2.0). The polydispersity typically narrows with increased monomer addition as shown in Table 3. To achieve narrow polydispersities it is necessary to control the rate of monomer addition to maintain relatively high % solids (typically in range 70–95%) and a constant monomer concentration.

Preparation of Methyl Methacrylate-block-Butyl Methacrylate

| A. Preparation of MMA compound (2) | | |
|---|---|---|
| | Water | 150 g |
| | SDS (3 wt % aq. solution) | 6 g |
| | 4,4'-azobis(4-cyanopentanoic acid) | 0.280 g |
| Monomer Shot: | MMA | 7 g |
| | MeCo(III)DEG | 5 mg |
| Monomer Feed: | MMA | 63.4 g |
| | MeCo(III)DEG | 2.3 mg |

The water, initiator and SDS were combined and degassed under nitrogen in a multi-necked 250 mL reactor. The mixture was heated to 80° C. and the monomer shot added immediately. The monomer feed was added over 90 min. The temperature was increased to 85° C. and held for a further 90 min.

GPC: $\overline{M}_n$ 3500 $\overline{M}_w$ 5600; Dispersity 1.61.
$^1$H NMR: $\overline{M}_n$ 3100

| B. Preparation of MMA-block-BMA | | |
|---|---|---|
| | MMA compound (2) latex (33% solids)* | 30 g |
| Initiator Feed: | K$_2$S$_2$O$_8$ (0.4 wt % aq. solution) | 28.4 mL/90 min |
| Monomer Feed: | nBMA | 20 g/90 min |

*from Part A

The MMA compound (2) was heated to 80° C. in a multi-neck 250 mL reactor under nitrogen for 30 min. The initiator and monomer feeds were added concurrently over 90 min. The monomer and initiator additions were then repeated until a total of 100 g BMA was added. Portions of SDS (1 g of a 3 wt % aqueous solution) were added hourly during the monomer addition. After monomer addition was complete the reaction temperature was increased to 85° C. and held for 90 min.

GPC: $\overline{M}_n$ 23800, $\overline{M}_w$ 33100; Dispersity 1.39

TABLE 3

Variation in Molecular Weight and Polydispersity with Monomer Addition (compound (2) = PMMA)

| Example | Monomer | monomer (g) | $M_n$[a] | $M_2/M_n$ | $M_n$(calc)[b] |
|---|---|---|---|---|---|
| 15 | BMA | 0 | 3500 (3100[c]) | 1.6 | |
| | | 20 | 8300 (9700) | 1.5 | 9300 |
| | | 40 | 13200 (15400) | 1.4 | 15500 |
| | | 60 | 17700 (20100) | 1.3 | 21700 |
| | | 80 | 20000 (23600) | 1.3 | 27900 |
| | | 100 | 23800 (28100) | 1.4 | 34500 |
| 16 | MMA | 0 | 1850 (2100) | 1.5 | |
| | | 15.8 | 3800 (4320) | 1.4 | 4800 |
| | | 24.2 | 4770 (5300) | 1.4 | 6300 |
| | | 31.6 | 5740 (6500) | 1.5 | 7700 |
| | | 63.1 | 9790 (11200) | 2.7 | 13500 |
| 17 | MMA | 0 | 3260 (3700) | 1.5 | |
| | | 11.8 | 9900 (11300) | 1.4 | 10900 |
| | | 19.0 | 13700 (15700) | 1.5 | 15600 |
| | | 35.2 | 22100 (25300) | 1.6 | 26200 |
| | | 52.9 | 31300 (35900) | 1.8 | 37700 |
| | | 65.8 | 37600 (43200) | 2.1 | 46100 |
| 18 | BMA | 0 | 2000[c] | 1.6 | |
| | | 25.7 | 6700 (7900) | 1.2 | 8000 |
| | | 33.6 | 8400 (9900) | 1.2 | 9900 |
| | | 50.3 | 12300 (14500) | 1.2 | 13800 |
| | | 59.8 | 14900 (17600) | 1.2 | 16100 |
| | | 67.1 | 16800 (19800) | 1.2 | 17800 |
| | | 88.2 | 18400 (21700) | 1.4 | 22800 |
| 20 | EHMA | 0 | 2050[c] | 1.7 | |
| | | 20 | 4900 | 1.5 | 4800 |
| | | 40 | 7100 | 1.4 | 7600 |
| | | 60 | 10500 | 1.3 | 10400 |
| | | 78 | 11800 | 1.3 | 12900 |

[a]GPC molecular weight in polystyrene equivalents (values obtained by applying universal calibration in parentheses). Numbers rounded to nearest hundred.
[b]Mn = ([monomer]/[compound(2)] × monomer Mn) + compound (2) Mn. Discrepancies between calculated and found Mn may reflect precision of compound (2) concentration.
[c]Mn of PMMA.

EXAMPLES 20–21

Triblock Copolymers

These examples illustrate the synthesis of an ABA triblock copolymer. The procedure is compatible with at 'one-pot' operation.

| Preparation of MMA-block-BMA-block-MMA. A. Preparation of MMA-block-BMA | | | |
|---|---|---|---|
| | | MMA compound (2) latex* | 30 g |
| | | SDS (3 wt % aq. solution) | 1 g |
| Initiator Feed: | (0.316 mL/min) | $K_2S_2O_8$ (0.36 wt % aq. solution) | 40.8 g |
| Monomer Feed: | (0.218 mL/min) | nBMA | 25.2 g |

*ca. 32% solids, $\overline{M}_n$ 2040, Dispersity 1.51, prepared with iPrCo(III)DMG procedure similar to Example 15, part A)

The MMA compound (2) latex and SDS was placed in a multi-neck 250 mL reactor, degassed under vacuum, then heated to 80° C. under nitrogen. The initiator and monomer feeds were added concurrently over 130 min. After monomer addition was complete the reaction was held at 80° C. for 90 min. A shot of surfactant was added (1 g of 3 wt % aq. solution of SDS) at 60 min intervals.

GPC: $\overline{M}_n$ 6650, $\overline{M}_w$ 8400; Disperity 1.26.

| B. Preparation of MMA-block-BMA-block-MMA | | | |
|---|---|---|---|
| | | MMA-block-BMA compound (2) latex* | 30 g |
| | | SDS (3 wt % aq. solution) | 1 g |
| Initiator Feed: | (0.316 mL/min) | $K_2S_2O_8$ (0.36 wt % aq. solution) | 21.5 g |
| Monomer Feed: | (0.119 mL/min) | MMA | 7.5 g |

*ca. 32% solids, from part A

The MMA compound (2) latex and SDS was placed in a multi-neck 250 mL reactor, degassed under vacuum, then heated to 80° C. under nitrogen. The initiator and monomer feeds were added concurrently over 68 min. After monomer addition was complete the reaction was held at 80° C. for 90 min. A shot of surfactant was added (1 g of 3 wt % aq. solution of SDS) at 60 min intervals. The conversion based on % solids was 98%.

GPC: $\overline{M}_n$ 12660, $\overline{M}_w$ 16590; Dispersity 1.35

EXAMPLE 22

'One Pot' Synthesis of (MMA-co-MAA)-block-BMA

These examples illustrate a 'one-pot' synthesis of compound (2) and block copolymer by emulsion polymerization.

| A. Preparation of MMA-co-MAA compound (2) | | | |
|---|---|---|---|
| | | Water | 120.00 g |
| | | MAA-block-BMA | 2.87 g |
| Solution 1: | | iprCo(III)DMG | 7.5 mg |
| | | WAKO VA-044 | 0.33 g |
| | | MMA | 4.0 g |
| Feed 1: | | MMA | 42.14 g |
| | | iprCo(III)DMG | 15.0 mg |
| Feed 2: | | MAA | 15.60 g |
| | a. 0–20 min | | 0.137 mL/min |
| | b. 20–40 min | | 0.276 mL/min |
| | c. 40–60 min | | 0.356 mL/min |

The MAA-block-BMA(stabilizer/surfactant)/water mixture was heated to 58° C. in a multi-necked 500 mL reactor under nitrogen for 30 min. Solution 1 was added and the monomer feeds were added concurrently over 60 min. On completion of the monomer addition the reaction temperature was increased slowly to 80° C.

GPC: $\overline{M}_n$ 880, $\overline{M}_w$ 1400; Dispersity 1.59

| B. Preparation of (MMA-co-MAA)-block-BMA | | |
|---|---|---|
| | MMA/MAA Compound 2 latex | from part A |
| | MAA-block-BMA | 0.288 g |
| | water | 9.3 g |
| | $K_2S_2O_8$ | 0.224 g |
| Initiator Feed: | $K_2S_2O_8$ (1.25% aq. solution) | 28.4 mL |
| Monomer Feed: | nBMA | 12 g |

The MMA/MAA compound (2) latex from Part A was held at 80° C. for 40 min under nitrogen. MAA-b-BMA (surfactant) was added and the reactor degassed for a further 20 min. The initiator was then added as a single shot. The initiator and monomer feeds were added concurrently over 90 min. On completion of the feeds the reaction temperature was held at 80° C. for 30 min and then increased to 85° C. for 90 min.

GPC: $\overline{M}_n$ 3090, $\overline{M}_w$ 5370; Dispersity 1.74

EXAMPLES 23–36

Synthesis of Block Copolymers in Solution

TABLE 4

Emulsion Triblock Copolymers

| | | Macromonomer | | | Block | |
|---|---|---|---|---|---|---|
| Example | Step:Monomer | Composition | $M_n^a$ | Dispersity | $M_n^a$ | Dispersity |
| 20 | 1:BMA | MMA | 2040 | 1.51 | 6650 | 1.26 |
| | 2:MMA | MMA-block-BMA | 6650 | 1.26 | 12660 | 1.35 |
| 21 | 1:BMA | MMA | 3500 | 1.62 | 23800 | 1.39 |
| | 2:MMA | MMA-block-BMA | 23800 | 1.39 | 26200 | 1.52 |

[a]GPC (polystyrene equivalents)

The following examples illustrate the synthesis of block copolymers from methacrylate compounds (2).

| Preparation of (MMA-co-MAA)-block-BMA | |
|---|---|
| MMA-co-MAA Compound 2 ($\overline{M}_n$ 1031; Dispersity 1.53) | 10.0 g |
| xylene | 30.0 g |
| t-butyl peroxybenzoate | 0.1 g |
| Feed One: n-butyl methacrylate | 10.0 g |
| Feed Two: t-butyl peroxybenzoate | 0.2 g |
| xylene | 10.0 g |

The compound (2) and initiator were dissolved in the solvent and heated to reflux under nitrogen. The monomer and initiator feeds were added concurrently over 180 min. After completion of the feeds, the mixture was heated under reflux for a further 180 min.

Conversion: >95%

GPC: $\overline{M}_n$ 1890, $\overline{M}$ 2640; Dispersity 140

TABLE 5

Solution Block Copolymers from Methacrylate Monomers

| | | | Compound (2) | | | Block | |
|---|---|---|---|---|---|---|---|
| Ex. | Mon. | $R^a$ Solvent | Composition | $M_n$ | Disp. | $\overline{M}_n$ | Disp. |
| 23 | nBMA | 46 iPrOH | $MAA_9$ | $880^c$ | — | $2400^d$ | 1.50 |
| 24 | nBMA | 46 iPrOH | $MAA_9$ | $880^c$ | — | $3050^d$ | 1.53 |
| 25 | nBMA | 46 EtOH | $MAA_9$-co-$BMA_5$ | $1620^d$ | 2.2 | $2320^d$ | 2.47 |
| 26 | BzMA | 47 iPrOH | $MMA_{20}$-co-$MAA_5^e$ | $2460^b$ | 1.23 | $6020^b$ | 1.63 |
| 27 | BzMA | 47 iPrOH | $MMA_{10}$-co-MAA5 | $1600^b$ | 1.71 | $5520^b$ | 1.80 |
| 28 | BzMA | 47 iPrOH | $BMA_{10}$-co-$MAA_5$ | $2040^b$ | 2.56 | $6070^b$ | 1.69 |
| 29 | BzMA | 47 iPrOH | $EHMA_{10}$-co-$MMA_5$ | $1900^b$ | 1.62 | $4020^b$ | 1.61 |
| 30 | MMA-$BMA^f$ | 46 iPrOH | $MAA_9$-co-$BMA_5$ | $1620^d$ | 2.2 | $2950^d$ | 1.81 |
| 31 | MMA-$BMA^f$ | 46 iPrOH | $MAA_9$-block-$BMA_5$ | $2400^d$ | 1.50 | $2790^d$ | 1.85 |
| 32 | MMA-$BMA^f$ | 46 iPrOH | MAA | $860^c$ | — | $3060^b$ | 1.64 |
| 33 | MMA | 46 iPrOH | $HEMA_{11}$ | $1550^d$ | — | $3620^d$ | 1.83 |
| 34 | MMA | 48 xylene | MMA-co-MAA | $1031^b$ | 1.53 | $2640^b$ | 1.40 |
| 35 | nBMA | 23 xylene | MMA | $890^b$ | 1.97 | $1340^b$ | 1.78 |
| 36 | MMA | BAc | MMA-co-MAA | $1031^b$ | 1.53 | $2068^b$ | 1.38 |

$^a$R = "recipe", similar to that of the Example referred to by number. All reactions were carried out at reflux. Conversions were typically > 85%
$^b$GPC (polystyrene equivalents).
$^c$from NMR.
$^d$GPC (PMMA equivalents).
$^e$Compound (2) prepared by emulsion polymerization.
$^f$1:1 mole ratio comonomers.

EXAMPLES 37–45
Synthesis of Block Copolymers in Solution

For monosubstituted monomers higher block purity is found when higher reaction temperatures are used. At low temperatures graft copolymer formation may dominate. Xylene and butyl acetate or other solvents with similar boiling point are preferred for block synthesese with monosubstituted monomers.

| Preparation of (MMA-co-MAA)-block-BA | |
|---|---|
| Compound 2 ($\overline{M}_n$ 1031; Dispersity 1.53) | 8.88 g |
| Xylene | 37.8 g |
| t-butyl peroxybenzoate | 0.1 g |
| n-butyl acrylate | 1.6 g |
| Feed: t-butyl peroxybenzoate | 0.16 g |
| n-butyl acrylate | 9.5 g |

The compound (2) and initiator were dissolved in the solvent and heated to reflux under nitrogen. The monomer and initiator feed was added over 180 min. After completion of the feeds, the mixture was heated under reflux for a further 180 min.

Conversion: >95%.

GPC: $\overline{M}_n$ 1760, $\overline{M}_w$ 2710; Dispersity 1.54

TABLE 6

Solution Block Copolymers from Monosubstituted Monomers

| | | | | Compound (2) | | Block | | |
|---|---|---|---|---|---|---|---|---|
| Ex. | Mon. | $R^a$ | Solvent | Composition | $\overline{M}_n$ | Disp. | $M_n$ | Disp. | Purity$^b$ |
| 37 | BA | 37 | xylene | MMA-co-MAA | $1031^d$ | 1.53 | $1760^d$ | 1.54 | >80% |
| 38 | BA | 46 | iPrOH | $MAA_9$ | $880^c$ | — | $2620^d$ | 2.45 | >50%$^e$ |
| 39 | BA | 37 | BAc | MMA-co-MAA | $1031^d$ | 1.53 | $2683^d$ | 1.76 | >80% |
| 40 | BA | 23 | xylene | MMA | $840^d$ | 1.97 | $2100^c$ | 2.05 | >70% |
| 41 | S | 46 | iPrOH | MAA | $880^c$ | — | $1890^d$ | 2.10 | >50%$^e$ |
| 42 | S | 37 | BAc | MMA | $1640^d$ | 2.22 | $2530^d$ | 2.37 | >70% |
| 43 | S | 37 | BAc | nBMA | $1050^d$ | 2.04 | $4650^d$ | 2.79 | >70% |
| 44 | S | 37 | BAc | tBMA | $2620^d$ | 2.62 | $3620^d$ | 2.20 | >70% |
| 45 | S | 23 | xylene | MMA | $840^d$ | 1.97 | $1780^c$ | 2.04 | >70% |

$^a$R = "recipe", similar to that of the Example referred to by number. All reactions were carried out at reflux. Conversions were typically > 85%
$^b$from comparison of GPC and NMR molecular weights
$^c$from NMR
$^d$GPC (polystyrene equivalents)
$^e$evidence of reduced block copolymer formation

EXAMPLE 46

Preparation of MAA-block-BMA

|  |  |  |
|---|---|---|
|  | methacrylic acid Compound 2* | 15 g |
|  | isopropanol | 62.8 g |
|  | azobis(isobutyronitrile) | 0.32 g |
|  | acetone | 2 mL |
| Feed: | n-butyl methacrylate | 14.3 g |

*MAA compound (2) having $\overline{M}_n$ 1040 and Dispersity 1.80.

The compound (2) and solvent were heated to reflux (ca. 80° C.) under nitrogen. The initiator (dissolved in acetone) was added as a single shot and the monomer feed added over 180 min. After 90 min the initiator was replenished (0.16 g AIBN/1 mL acetone). After completion of feed the mixture was heated under reflux for a further 150 min.

Conversion: >87%

GPC: $\overline{M}_n$ 2580, $\overline{M}_w$ 4900; Dispersity 1.90.

EXAMPLE 47

This example shows the successful 20-fold scale up of Example 46.

Preparation of MAA-block-BMA

|  |  |  |
|---|---|---|
|  | methacrylic acid compound (2)* | 200 g |
|  | isopropanol | 1000 mL |
|  | azobis(isobutyronitrile) | 4.01 g |
| Feed: (1 mL/min) | n-butyl methacrylate | 326.1 g |

*$M_n$ from NMR 1204.

The compound (2) and solvent were place in a 2 L multinecked flask equipped with mechanical stirrer, degassed, and heated to reflux (ca 80° C.) under nitrogen. The initiator was added as a single shot and the monomer feed commenced. At ca. 90 min intervals the initiator was replenished (2 g shots of AIBN). On completion of feed, the mixture was heated under reflux for a further 150 min.

Conversion: >95%

GPC: $\overline{M}_n$ 3532, $\overline{M}_w$ 5102; Disperity 1.45

EXAMPLE 48

This example illustrates the synthesis of hydrophilic-hydrophobic block copolymers based on methacrylate ester-methacrylic acid copolymers by solution polymerization.

A. Preparation of MAA-co-BMA Compound (2)

|  |  |  |  |
|---|---|---|---|
|  | Isopropanol | 20.06 g |  |
|  | MAA | 1.21 g |  |
|  | nBMA | 3.86 g |  |
|  | 2,2'-azobis(2-butanenitrile) | 0.25 g |  |
| Shot: | IPrCo(III)DMG (0.35 wt % in isopropanol) | 7.5 mL |  |
|  |  | 0.140 g |  |
| Feed 1: (0.128 mL/min) | IPrCo(III)DMG (0.33 wt % in isopropanol) | 30.7 mL |  |
| Feed 2: (0.224 mL/min) | MAA | 11.40 g |  |
|  | nBMA | 37.85 g |  |

The isopropanol was degassed under nitrogen in a multi-necked 250 mL reactor equipped with a mechanical stirrer. The monomers were then added and the mixture and heated to reflux (80° C.). The shot was then added and the feeds added over 240 min by syringe pumps. Further initiator (0.125 g) was added at 120 min and 240 min. On completion of the feeds the temperature was held at 80° C. for 90 min. The conversion based on % solids was >85%.

NMR composition: $MAA_5\text{co-}BMA_{11}$

GPC(PMMA equivalents): $\overline{M}_n$ 2040, $\overline{M}_w$ 5210; Dispersity 2.56

B. Preparation of MAA-co-BMA-block-Benzyl Methacrylate

|  |  |  |
|---|---|---|
|  | MAA-co-nBMA compound (2) solution* (60 wt % in isopropanol) | 30.0 g |
|  | isopropanol | 9.98 g |
|  | 2,2'-azobis(2-butanenitrile) | 0.092 g |
| Feed: (0.202 mL/min) | BzMA | 18.0 g |
|  | isopropanol | 15.0 g |

*from Part A

The compound (2) solution and isopropanol were placed in a multi-neck 250 mL reactor fitted with a mechanical stirrer, degassed then heated to 80° C. under nitrogen. The initiator was added and the monomer feed commenced and added over 180 min by syringe pump. Further aliquots of initiator were added at 90 min (0.049 g) and 180 min (0.087 g). The reaction was held at 80° C. for a further 90 min. The conversion based on % solids was >94%.

NMR composition: $MAA_5\text{-co-}BMA_{11}\text{-block-}BzMA_{20}$

GPC(PMMA equivalents): $\overline{M}_n$ 6070, $\overline{M}_w$ 9770; Dispersity 1.61

EXAMPLE 49

This example illustrates the synthesis of a hydrophilic-hydrophobic block copolymer based on HEMA by solution polymerization.

A. Preparation of Hydroxyethyl Methacrylate Compound (2)

|  |  |  |
|---|---|---|
|  | Water | 75 g |
| Shot: | HEMA | 3.5 g |
|  | iPrCo(III)DMG | 4 mg |
|  | 4,4'-azobis(4-cyanopentanoic acid) | 0.140 g |
| Feed: | HEMA | 31.7 g |
|  | iPrCo(III)DMG | 4.4 mg |

The water was degassed under nitrogen in a multi-necked 250 mL reactor equipped with a mechanical stirrer and heated to 80° C. The initial shot was then added and the monomer feed was added over 90 min by syringe pump. On completion of the feed further initiator (0.070 g) was added and the temperature was held at 80° C. for 180 min. The conversion based on % solids was >90%. NMR: $\overline{M}_n$ 1550

B. Preparation of Hydroxyethyl Methacrylate-block-Methyl Methacrylate

|  |  |  |
|---|---|---|
|  | HEMA compound (2) solution (3% in water)* | 30 g |
|  | isopropanol | 40 g |
|  | azobisisobuyronitrile | 0.19 g |
| Monomer Feed: | HEMA | 15.5 g |

*from Part A

The HEMA compound (2) and isopropanol were placed in a multi-neck 250 mL reactor fitted with a mechanical stirrer, degassed under vacuum, then heated to 80° C. under nitrogen. The initiator was added and the monomer feed commenced and added over 120 min by pump. Further aliquots of initiator were added at 90 min (0.09 g) and 180 min (0.07 g). The reaction was held at 80° C. for a further 90 min. The conversion based on % solids was >90%.

GPC: $\overline{M}_n$ 3620, $\overline{M}_w$ 6650; Divsersity 1.83

EXAMPLES 50–52

This procedure illustrates the preparation of blocks from compounds (2) prepared with addition-fragmentation transfer agents in emulsion polymerization. Use of these reagents allows a wide range of end-group functionality to be introduced into the final product.

The recipe is compatible with a one-pot synthesis of block-copolymer from transfer agent and monomers.

Preparation of Methyl Methacrylate-block-Butyl Methacrylate

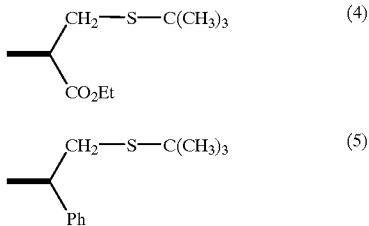

A. Preparation of MMA compound (2)

|  |  | Water | 37.5 g |
|---|---|---|---|
|  |  | SDS (3% aq. solution) | 3 g |
| Shot: |  | MMA | 1.56 g |
|  |  | allyl sulfide 4 | 0.078 g |
|  |  | 4,4'-azobis(4-cyanopentanoic acid) | 0.071 g |
| Feed 1: (0.188 mL/min) |  | MMA | 14.04 g |
|  |  | allyl sulfide 4 | 0.668 g |
| Feed 2: (0.188 mL/min) |  | MMA | 5 g |

The water, SDS were combined and degassed under vacuum in a multi-necked 250 mL reactor equipped with a mechanical stirrer. The mixture was heated to 80° C. under nitrogen and the shot added. Feed 1 was added over 80 min by syringe pump Feed 2 was then added over 28 min. On completion of the feeds the temperature was held at 80° C. for a further 90 min. The conversion based on % solids was 98%.

GPC: $\overline{M}_n$ 5520 $\overline{M}_w$ 3770; Dispersity 1.59.

B. Preparation of MMA-block-BMA.

|  | MMA compound (2) latex (ca. 32% solids)* | 27.1 g |
|---|---|---|
|  | SDS(3% aq. solution) | 1.0 g |
| Initiator Feed: (0.316 mL/min) | $K_2S_2O_8$ (0.36 wt % aq. solution) | 23.7 g |
| Monomer Feed: (0.218 mL/min) | nBMA | 15.5 g |

*from Part A

The MMA compound (2) latex and SDS was placed in a multi-neck 250 mL reactor, degassed under vacuum, then heated to 80° C. under nitrogen. The initiator and monomer feeds were added concurrently over 70 min. After monomer addition was complete the reaction was held at 80° C. for 90 min. The conversion based on % solids was 98%.

GPC: $\overline{M}_n$ 12600, $\overline{M}_w$ 17200; Dispersity 1.36

TABLE 7

Block Copolymers by Emulsion Polymerization

| Example | Monomer | Transfer Agent[a] | Compound (2) Composition | $M_n^b$ | Disp. | Block $M_n^b$ | Disp. |
|---|---|---|---|---|---|---|---|
| 50 | nBMA | 4 | MMA | 5520 | 1.59 | 12600 | 1.36 |
| 51 | MMA | 4 | nBMA | 5300 | 1.57 | 7300 | 1.43 |
| 52 | nBMA | 5[c] | MMA | 5450 | 1.57 | 24700 | 1.46 |

[a]Compound (2) prepared with addition-fragmentation transfer agent indicated.
[b]GPC (polystyrene equivalents).
[c]Compound (2) synthesis carried out at 90° C.

EXAMPLES 53–56

This procedure illustrates the preparation of blocks from compounds (2) prepared with addition-fragmentation transfer agents by solution polymerization. Use of these reagents allows a wide range of monomers to be used and permits various end-group functionality to be introduced into the final product.

Preparation of Styrene-block-p-methylstyrene
A. Preparation of Styrene compound (2)

|  |  |  |
|---|---|---|
|  | Styrene | 30.10 g |
|  | Butyl acetate | 10.03 g |
|  | allyl sulfide 4 | 1.63 g |
| Feed 1: (0.210 mL/min) | Styrene | 39.98 g |
|  | allyl sulfide 4 | 6.67 g |
| Feed 2: (0.063 mL/min) | 1,1'-azobis(4-cyclohexanecarbonitrile) | 0.283 g |
|  | Butyl acetate | 20.01 g |

The styrene solution was degassed under nitrogen in a multi-necked 250 mL reactor equipped with a mechanical stirrer. The mixture was heated to reflux (125° C.) under nitrogen and the feeds added over 240 min by syringe pump. The compound (2) was isolated by two precipitations into acidified methanol. The conversion based on isolated compound (2) was 50%.

GPC: $\overline{M}_n$ 1880 $\overline{M}_w$ 2950; Dispersity 1.57.

B. Preparation of Styrene-block-p-Methylstyrene.

|  |  |  |
|---|---|---|
|  | Styrene compound (2)* | 4.02 g |
|  | Butyl acetate | 3.53 g |
|  | p-Methylstyrene | 0.46 g |
| Initiator Feed: (0.0177 mL/min) | 1,1'-azobis (4-cyclohexanecarbonitrile) | 0.108 g |
|  | Butyl acetate | 25.13 g |
| Monomer Feed: (0.0132 mL/min) | p-Methylstyrene | 19.01 g |

*from Part A

The styrene compound (2) and butyl acetate were placed in a multi-neck 100 mL reactor under nitrogen and heated to reflux (ca. 125° C.). After 10 min, the p-methylstyrene was added. The initiator and monomer feeds were then commenced and added over 24 h. The conversion based on monomer consumption was 84%.

GPC: $\overline{M}_n$ 9500, $\overline{M}_w$ 24620; Dispersity 2.59 (includes compound (2) peak)

TABLE 8

Styrene Block Copolymers by Solution Polymerization

| Example | Monomer | Transfer Agent[a] | Compound (2) M$_n$[b] | Disp. | Block M$_n$[b] | Disp. | Solvent | % Conv.[c] |
|---|---|---|---|---|---|---|---|---|
| 53 | pMS | 4 | 1880 | 1.59 | 17260 | 1.61 | BAc | 90 |
| 54 | nBMA | 4 | 1880 | 1.59 | 9120 | 1.43 | MEK | 80 |
| 55 | nBMA | 4 | 1880 | 1.59 | 17930 | 1.62 | BAc | 60 |
| 56 | nBMA | 5 | 2330 | 1.55 | 16870 | 1.42 | MEK | 50 |

[a]Compound (2) prepared with addition-fragmentation transfer agent indicated.
[b]GPC (polystyrene equivalents).
[c]approx conversion of compound (2) to block. Monomer conversion is > 85%.

These examples describe a generalized process for the preparation of narrow polydispersity block copolymers and homopolymers by solution polymerization using vinyl compounds (2) selected from methacrylate dimers and trimers.

The general procedure for the polymerization is to slowly add the selected monomer(s), (i), and free radical initiator (iii) to the unsaturated transfer agent (2) at a rate to avoid excessive buildup in monomer concentration. A small amount of monomer(s) can be added to the transfer agent before the start of polymerization.

The polymerization reaction is started by heating the reactor containing (2) to the desired temperature and starting the gradual and continuous feeds of monomer(s) and free radical initiator.

The length of the polymerization time is dependent upon the temperature chosen and the molecular weight of the polymer desired. Higher temperatures allow for faster monomer feed rates and shortened times.

The choice for initiator depends upon the temperature used. It is convenient to add the initiator either in a solvent or mixed with some of the monomer(s) by means of a controlled rate feeder pump. When no solvent is used, the polymerization runs under bulk conditions at a well controlled rate.

In this process, the amount of initiator does not limit the polymer molecular weight. Reaction of unsaturated ends of (2) controls the degree of polymerization. The total number of moles of free radical initiator is generally set to be less than 15–20% of the number of moles of (2) used in the process.

The following Tables illustrate some of the specific polymers and their conditions for polymerization which have been practiced using this procedure.

TABLE 9

Solution Process Conditions

| Ex. | Vinyl Transfer Agent | Monomer(s) | Temp. ° C. | Initiator | Polymeriz. Time hr | Comments |
|---|---|---|---|---|---|---|
| 57 | MMA$_3$ | MMA | | VAZO 52 4.29 gm | | 25 gm MMA at start |
| | 100 gm | 500 gm | 60 | 300 ml EAc | 29.8 | |
| 58 | MMA$_3$ | 30:70 GMA/CHMA | | VAZO 52 13.1 gm | | 36 gm monomer mix at start |
| | 90 gm | 1400 gm | 60 | 386 ml EAc | 30 | |
| 59 | MMA$_3$ | GMA 322 gm | | VAZO 52 10.4 gm | | 16 gm GMA at start |
| | 50 gm | 50:50 MMA/BMA 710 gm | 60 | 290 ml EAc | 29.4 | add GMA then MMA/BMA mix |
| 60 | MMA$_3$ | 30:70 GMA/MMA | | VAZO 88 12.5 gm | | 50 gm monomer mix |
| | 200 gm | 1115 gm | 100–132 | 228 ml BAc | 9.7 | at start |
| 61 | GMA$_2$ | 15.6:84.4 GMA/MMA | | VAZO 88 21.7 gm | | 15 gm monomer mix |
| | | 1460 gm | 120 | 346 ml BAc | 16.6 | at start |
| 62 | GMA$_2$ | 12:26:62 IBMA/GMA/MMA | | VAZO 88 11.6 gm | | 5 gm monomer mix |
| | | 557 gm | 130 | 204 ml BAc | 11.5 | at start |
| 63 | GMA$_2$ | 23:20:57 BMA/GMA/MMA | | VAZO 88 12.8 gm | | 2 gm monomer mix |
| | | 755 gm | 120 | 203 ml BAc | 24 | at start |
| 64 | GMA$_2$ | 10:32:58 IBMA/GMA/MMA | | t-butyl- perbenzoate | | 13 gm monomer mix |
| | | 455 gm | 140 | 6.8 gm | 9.9 | at start |

TABLE 10

Summary of Narrow Polydispersity Polymers Made by Solution Process

| Example | Polymer Description | Mn (by GPC) | Dispersity |
|---|---|---|---|
| 57 | $MMA_n$ | 2700 | 1.58 |
| 58 | $MMA_2//GMA_mCHMA_nMMA_p//MMA$ | 4970 | 1.44 |
| 59 | $MMA_2//GMA_m//MMA_nBMA_p//MMA$ | 6800 | 1.48 |
| 60 | $MMA_2//GMA_mMMA_n//MMA$ | 2170 | 1.44 |
| 61 | $GMA//MMA_mGMA_n//GMA$ | 3360 | 1.45 |
| 62 | $GMA//MMA_mIBMA_n\ GMA_p//GMA$ | 3420 | 1.3 |
| 63 | $GMA//MMA_mBMA_n\ GMA_p//GMA$ | 4560 | 1.49 |
| 64 | $GMA//MMA_mBMA_n\ GMA_p//GMA$ | 2880 | 1.45 |

What is claimed is:

1. A process for the synthesis of polymers having a polydispersity of less than 1.7 and of the general formula:

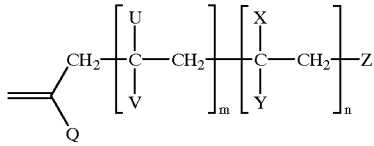

comprising contacting:

(i) a vinyl monomer of the formula

$CH_2=CUV$ (ii) a vinyl-terminated compound of formula

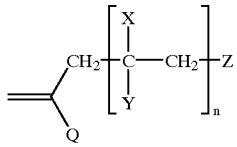

and (iii) free radicals, produced from a free radical source; and increasing the molar amount of said polymers (1) by one or both of:
(a) decreasing the molar amount of (iii) for any given conversion of (i); and;
(b) decreasing the molar amount of (i) for any given conversion of (iii);

and wherein:

Q is selected from the group consisting of H, R, OR, $O_2CR$, halogen, $CO_2H$, $CO_2R$, CN, $CONH_2$, CONHR and $CONR_2$;

U is selected from the group consisting of H and R;

V is selected from R, OR, $O_2CR$, halogen, $CO_2H$, $CO_2R$, CN, $CONH_2$, CONHR and $CONR_2$;

X is selected from the group consisting of H and R;

Y is selected from the group consisting of R, OR, $O_2CR$, halogen, $CO_2H$, $CO_2R$, CN, $CONH_2$, CONHR and $CONR_2$;

Z is selected from the group consisting of H, $SR^1$, S(O)R, $S(O)_2R$, $R^2$ and $R^3$;

R is selected from the group consisting of substituted and unsubstituted alkyl, aryl, aralkyl, alkaryl and organosilyl groups wherein the substituent(s) are independently selected from the group carboxyl, epoxy, hydroxyl, alkoxy, amino and halogen;

$R^1$ is selected from the group H, substituted and unsubstituted alkyl, aryl, aralkyl, alkaryl, organosilyl wherein the substituent(s) are independently selected from the group carboxyl, epoxy, hydroxyl, alkoxy, amino and halogen;

$R^2$ is selected from the group consisting of free radical initiator-derived fragments of substituted and unsubstituted alkyl, cycloalkyl, aryl, aralkyl, alkaryl, organosilyl, alkoxyalkyl, alkoxyaryl, sulfate groups wherein the substituent(s) are independently selected from R, $OR^1$, $O_2CR$, halogen, $CO_2H$ (and salts), $CO_2R$, CN, $CONH_2$,

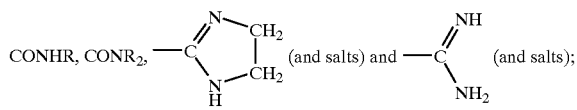

$R^3$ is selected from the group consisting of radical chain transfer agent-derived fragments of substituted and unsubstituted alkyl, cycloalkyl, aryl, aralkyl, alkaryl, organosilyl, alkoxyalkyl, alkoxyaryl, and $PR_2$ groups wherein the substituent(s) are independently selected from R, $OR^1$, SR, $NR_2$, NHR, $O_2CR$, halogen, $CO_2H$, $CO_2R$, CN, $CONH_2$, CONHR, and $CONR_2$;

m and n are independently $\geq 1$; and when either or both of m and n are greater than 1, the repeat units are the same or different.

2. The process according to claim 1 wherein (i) is the group consisting of selected from one or more of following monomers, methyl methacrylate, ethyl methacrylate, propyl methacrylate, butyl methacrylate, 2-ethylhexyl methacrylate, isobornyl methacrylate, methacrylic acid, benzyl methacrylate, phenyl methacrylate, methacrylonitrile, alpha methyl styrene, methyl acrylate, ethyl acrylate, propyl acrylate, butyl acrylate, 2-ethylhexyl acrylate, isobornyl acrylate, acrylic acid, benzyl acrylate, phenyl acrylate, acrylonitrile, styrene, functional methacrylate, acrylates and styrene selected from glycidyl methacrylate, 2-hydroxyethyl methacrylate, hydroxypropyl methacrylate, hydroxybutyl methacrylate, diethylaminoethyl methacrylate, triethyleneglycol methacrylate, itaconic anhydride, itaconic acid, glycidyl acrylate, 2-hydroxyethyl acrylate, hydroxypropyl acrylate, hydroxybutyl acrylate, diethylaminoethyl acrylate, triethyleneglycol acrylate, methacrylamide, N-tert-butyl methacrylamide, N-n-butyl methacrylamide, N-methyl-ol methacrylamide, N-ethyl-ol methacrylamide, N-tert-butyl acrylamide, N-n-butyl acrylamide, N-methyl-ol acrylamide, N-ethyl-ol acrylamide, vinyl benzoic acid, diethylamino styrene, alphamethylvinyl benzoic acid, diethylamino alphamethylstyrene, para-methylstyrene, p-vinyl benzene sulfonic acid, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate, vinyl chloride, vinyl fluoride, and vinyl bromide.

3. The process according to claim 1 wherein in (ii) Q, —XYC—CH$_2$—, Z and "n" are independently selected from one or more of the following:

Q=H, methyl, ethyl, butyl, cyclohexyl, methoxy, ethoxy, propoxy, butoxy, phenoxy, acetate, propionate, butyrate, benzoate, carboxylate, chlorine, bromine, fluorine, iodine, nitrile, amide, N-methylamide, N-ethylamide, N-propylamide, N,N-dimethylamide, N,N-diethylamide, N,N-dibutylamide, N-methyl-N-ethylamide, carboxylate ester of methyl, ethyl, propyl, butyl, benzyl, phenyl, 2-hydroxyethyl, 3-hydroxypropyl, 2-hydroxypropyl, 4-hydroxy-butyl, 3-hydroxybutyl, 2-hydroxybutyl, 3-trimethoxysilylpropyl, 3-triethoxysilylpropyl, 3-tributoxy-silylpropyl, 3-tri(isopropoxy)silylpropyl, 2-aminoethyl, 3-amino-propyl, 2-aminopropyl, 4-aminobutyl, 3-aminobutyl, 2-aminobutyl, 2-epoxypropyl, or 3-epoxypropyl;

—XYC—CH$_2$—=derived from one or more of the following monomers: methyl methacrylate, ethyl methacrylate, propyl methacrylate, butyl methacrylate, 2-ethylhexyl methacrylate, isobornyl methacrylate, methacrylic acid, benzyl methacrylate, phenyl methacrylate, methacrylonitrile, styrene, alpha methyl styrene, glycidyl methacrylate, 2-hydroxyethyl methacrylate, hydroxypropyl methacrylate, hydroxybutyl methacrylate, diethylaminoethyl methacrylate, triethyleneglycol methacrylate, N-tert-butyl methacrylamide, N-n-butyl methacrylamide, N-methyl-ol methacrylamide, N-ethyl-ol methacrylamide, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, methyl acrylate, ethyl acrylate, propyl acrylate, butyl acrylate, 2-ethylhexyl acrylate, isobornyl acrylate, acrylic acid, benzyl acrylate, phenyl acrylate, acrylonitrile, styrene, glycidyl acrylate, 2-hydroxyethyl acrylate, hydroxypropyl acrylate, hydroxybutyl acrylate, diethylaminoethyl acrylate, triethyleneglycol acrylate, N-tert-butyl acrylamide, N-n-butyl acrylamide, N-methyl-ol acrylamide, N-ethyl-ol acrylamide, vinyl benzoic acid, diethylamino styrene, p-vinyl benzene sulfonic acid, para-methylstyrene, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate, Z=H, SR$^1$, S(O)R, S(O)$_2$R, R$^2$, or R$^3$;

R=methyl, ethyl, propyl, n-butyl, tert-butyl, isobutyl, phenyl, benzyl, 2-phenylpropyl, trimethoxysilylpropyl, tributoxysilyl-propyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxy-propyl, or heptafluoropropyl;

R$^1$=hydrogen, methyl, ethyl, propyl, n-butyl, tert-butyl, isobutyl, phenyl, benzyl, 2-phenylpropyl, trimethoxysilyl-propyl, tributoxysilylpropyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxypropyl, or heptafluoropropyl;

R$^2$=2,4-dimethylpentanenitrile, 2-methylbutanenitrile, 2-methylpropanenitrile, cyclohexanecarbonitrile, 4-cyanopentanoic acid, N,N'-dimethyleneisobutyramidine, N,N'-dimethyleneisobutyramidine hydrochloride, 2-amidinopropane, 2-amidinopropane hydrochloride, 2-methyl-N-[1,1-bis(hydroxymethyl)ethyl] propionamide, 2-methyl-N-[1,1-(hydroxymethyl)-2-hydroxyethyl]propionamide, 2-methyl-N-(2-hydroxyethyl)propionamide, isobutyamide hydrate, hydroxyl, or sulfate;

R$^3$=1,1-bis(carboethoxy)ethyl, 1,1-bis(carbomethoxy) ethyl, bis(carboethoxy)methyl, bis(carbomethoxy) methyl, 1-carboethoxy-1-phenyl ethyl, 1-carbomethoxy-1-phenyl ethyl, chlorine, bromine, fluorine, iodine, 1-methyl-1-[carbo(2-epoxypropoxy)] ethyl, 1-methyl-1-[carbo(2-hydroxyethoxy)]ethyl, 1-methyl-1-[carbo(4-hydroxy-butoxy)]ethyl, 1-methyl-1-[carbo(2-aminoethoxy)]ethyl, 1-methyl-1-[carbo(3-trimethoxysilylpropoxy)]ethyl, 1-methyl-1-[carbo(3-triethoxysilylpropoxy)]ethyl, 1-methyl-1-[carbo(3-dimethoxyethoxysilylpropoxy)]ethyl, 1-methyl-1-[carbo(2-methoxyethoxy)]ethyl, (N,N-dimethylamino)(cyano)methyl, N,N-dimethylamino (benzo)methyl, thiomethyl(cyano)methyl, or thioethyl (cyano)methyl;

n≧1 and when greater than 1, the repeat units are the same or different.

4. The process according to claim 1 wherein (iii) is selected from the group consisting of one or more of the following: 2,2'-azobis(isobutyronitrile), 2,2'-azobis(2-butanenitrile), 4,4'-azobis(4-cyanpentanoic acid), 1,1'-azobis(cyclohexanecarbonitrile), 2-(t-butylazo)-2-cyanopropane, 2,2'-azobis[2-methyl-N-(1,1)-bis (hydroxymethyl)-2-hydroxyethyl]propionamide, 2,2'-azobis [2-methyl-N-hydroxyethyl)]-propionamide, 2,2'-azobis(N, N'-dimethylene-isobutyramidine)dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(iso-butyramide)dihydrate, t-butylperoxyacetate, t-butylperoxybenzoate, t-butylperoxyoctoate, t-butylperoxyneodecanoate, t-butylperoxyiso-butyrate, t-amylperoxypivalate, t-butylperoxypivalate, cumene hydroperoxide, dicumyl peroxide, benzoyl peroxide, potassium persulfate, ammonium persulfate.

5. The process of claim 1 wherein compound (2) is a block copolymer of general structure (1) and the product is a tri- or multi-block copolymer.

6. The process of claim 1 employing a temperature above 100° C.

7. A polymer made by the process of claim 1.

8. A polymer made by the process of claim 5.

9. The process of claim 1 wherein the presence of said (ii) decreases the molecular weight of the polymers formed, by at least five-fold below that obtained in the absence of said (ii).

* * * * *

UNITED STATES PATENT AND TRADEMARK OFFICE
CERTIFICATE OF CORRECTION

PATENT NO. : 6,291,620 B1  Page 1 of 1
DATED : September 18, 2001
INVENTOR(S) : Graeme Moad; Catherine Louise Moad, Julia Krstina Ezio Rizzardo, Thomas Robert Darling; Charles Thomas Berge It is certified that error appears in the above-identified patent and that said Letters Patent is hereby corrected as shown below:

<u>Column 22,</u>
Line 3, after "group" add -- consisting of --.

Signed and Sealed this

Twenty-sixth Day of March, 2002

*Attest:*

*Attesting Officer*

JAMES E. ROGAN
*Director of the United States Patent and Trademark Office*